United States Patent [19]

Stein et al.

[11] Patent Number: 4,877,828

[45] Date of Patent: Oct. 31, 1989

[54] SELF-BONDING SILICONE CAULKING COMPOSITIONS

[75] Inventors: Judith Stein, Schenectady; Tracey M. Leonard, Clifton Park, both of N.Y.

[73] Assignee: General Electric Company, Schenectady, N.Y.

[21] Appl. No.: 200,478

[22] Filed: May 31, 1988

[51] Int. Cl.⁴ ............................................. C08K 5/21
[52] U.S. Cl. .................................... 524/728; 524/714; 524/730; 524/788; 524/837; 524/863; 528/18; 528/34
[58] Field of Search ............... 524/788, 863, 837, 730, 524/714, 728, 588; 528/18, 34

[56] References Cited

U.S. PATENT DOCUMENTS

| | | | |
|---|---|---|---|
| 2,891,920 | 6/1959 | Hyde et al. | 260/29.2 |
| 3,294,725 | 12/1966 | Findlay et al. | 260/29.2 |
| 3,355,406 | 11/1967 | Cekada, Jr. | 260/29.2 |
| 3,664,997 | 5/1972 | Chadha et al. | 528/18 |
| 4,100,124 | 7/1978 | Ichikawa et al. | 524/730 |
| 4,221,688 | 9/1980 | Johnson et al. | 260/29.2 M |
| 4,277,382 | 7/1981 | Lin et al. | 524/588 |
| 4,506,058 | 3/1985 | Ashby et al. | |
| 4,587,288 | 5/1986 | Maxson et al. | 524/425 |
| 4,618,642 | 10/1986 | Schoenherr | 524/425 |
| 4,735,979 | 4/1988 | Beers | 524/188 |

*Primary Examiner*—John C. Bleutge
*Assistant Examiner*—Ralph H. Dean, Jr.
*Attorney, Agent, or Firm*—William A. Teoli; James C. Davis, Jr.; William H. Pittman

[57] ABSTRACT

Certain bissilyl ureas have been found useful as adhesion promoters for silicone latex compositions. Self-bonding silicone elastomers are provided which exhibit enhanced adhesion to a variety of substrates.

3 Claims, No Drawings

SELF-BONDING SILICONE CAULKING COMPOSITIONS

BACKGROUND OF THE INVENTION

The present invention relates to a silicone caulking composition prepared from a silicone emulsion reinforced with a nonsiliceous filler such as calcium carbonate. The silicone caulking compositions contain certain silyl ureas as adhesion promoters.

In copending application Ser. No. 200,482, filed May 31, 1988, and assigned to the same assignee as the present invention, certain curable silicone latex compositions are described made by the emulsification of a silanol-terminated polydiorganosiloxane with a nonionic surfactant. The pH of the silicone emulsion is adjusted with carboxylic acid to a pH between 4 and 6 which can then be optionally combined with an acidic colloidal silica along with a crosslinker and a tin condensation catalyst in the form of a stannoxane. The silicone emulsion is further combined with a nonsiliceous filler, such as calcium carbonate, to form a silicone caulk. Although the aforementioned caulking compositions have been found to exhibit significantly improved shelf stability, particularly in the absence of acidic colloidal silica, they do not adhere well to a variety of substrates.

In U.S. Pat. No. 4,506,058, Ashby et al., there is described self-bonding room temperature vulcanizable compositions (RTV) which utilizes certain bis(polyalkoxysilyl) ureas as adhesion promoters. The bissilyl ureas of Ashby et al. are incorporated into the base (RTV) mixture of ingredients under moisture-free substantially nonacidic conditions.

The present invention is based on the discovery that incorporation of an effective amount of certain bissilyl ureas, as defined hereinafter, to a reinforced base formulation of an aqueous emulsion of a nonionically stabilized silanol-terminated polydiorganosiloxane at a pH of about 4-6 containing a silane cross-linker and tin catalyst can provide a shelf stable silicone caulk capable of forming an elastomer upon removal of water, exhibiting excellent adhesion to a variety of substrates, such as steel or aluminum. Suprisingly, the bissilyl urea adhesion promoter is not adversely affected under acidic aqueous condition over an extended shelf period.

STATEMENT OF THE INVENTION

There is provided by the present invention a silicone caulking composition comprising, by weight,
(A) 100 parts of a base formulation having from about 40% to 60% by weight solids and a pH of about 4 to 6, which consists essentially of a silicone emulsion of a silanol-terminated polydiorganosiloxane having a molecular weight of about $5 \times 10^3$ to $15 \times 10^3$ and preferably $8 \times 10^3$ to $10 \times 10^3$ and an effective amount of a nonionic surfactant,
(B) up to 50 parts of a nonsiliceous filler,
(C) 0.1 to 5 parts and preferably 0.5 to 2 parts of an alkoxysilane,
(D) 0.3 to 2 parts, and preferably 0.4 to 1.5 parts of tin catalyst selected from stannoxanes, hydroxystannoxanes, and monoalkoxy stannoxanes, and
(E) 0.1 to 5 parts and preferably 0.3 to 0.8 part of bissilyl urea.

The aqueous emulsion of the silanol-terminated polydiorganosiloxane are preferably made by agitating a linear silanol-terminated polydiorganosiloxane in an aqueous media in the presence of 1% to 3% by weight of total emulsion of a nonionic surfactant. The pH of the emulsion can be adjusted to 4 to 6 by adding a carboxylic acid such as succinic acid.

The silanol-terminated polydiorganosiloxanes which can be used in the practice of the present invention have organo radicals attached to silicon which are selected from $C_{(1-13)}$ monovalent hydrocarbon radicals, and $C_{(1-13)}$ monovalent hydrocarbon radicals substituted with radicals inert during equilibration. Some of the organo radicals are, for example, $C_{(1-8)}$ alkyl radicals such as methyl, ethyl, propyl, butyl, pentyl, hexyl; haloalkyl radicals such as trifluoropropyl; and cyanoalkyl radicals such as cyanoethyl and cyanopropyl. In addition, the organo radicals attached to silicon can be selected from alkenyl radicals such as vinyl radicals; allyl radicals; alkylaryl radicals such as ethyl, phenyl; and arylkyl radicals such as tolyl, xylyl, etc. The monovalent organo radicals also can be aryl radicals such as phenyl, halophenyl such as chlorophenyl, bromophenyl, naphthyl radicals, anthro radicals, etc.

Silanol-terminated polydiorganosiloxanes useful in the practice of the invention are as shown by W. Noll, "Chemistry and Technology of Silicones", Academic Press, New York (1968) p. 240. They can be prepared by the polymerization of cyclic siloxanes, such as octamethyltetracyclosiloxanes, using acidic or basic catalysis. These silanolorganosiloxanes can be emulsified in water with nonionic emulsifying agents, such as alkylaryloxypoly(etheneoxy)ethanol. Useful nonionic emulsifying agents are the nonionic surfactant which can be used in the practice of the invention are, for example, saponins, condensation products of fatty acids with ethyleneoxide such as dodecylether of tetraethyleneoxide, and condensation production of ethyleneoxide with sorbitan trioleate.

Nonsiliceous fillers which can be used in the practice of the present invention to make the silicone caulking compositions are preferably calcium carbonate. However, other inorganic materials, such as titanium dioxide, aluminum oxide, carbon black, can be employed.

Tin condensation catalysts which can be used in the practice of the present invention are, for example, tin carboxylates included within the formula,

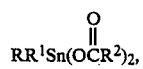

where R, $R^1$, and $R^2$ are selected from the same or different $C_{(1-8)}$ alkyl radicals such as methyl, ethyl, propyl, butyl, etc. Some of these tin carboxylates are, for example, dibutyltindilaurate and dibutyltindiacetate, the preferred tin catalysts are stannoxanes included within the formula,

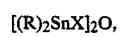

where R is defined above, and X is selected from halo, such as chloro, hydroxy or acyloxy such as acetoxy, or a mixture thereof. Some of these stannoxanes are $[(C_4H_7)_2SnCl]_2O$, and $(C_4H_7)_2Sn(Cl)—OSn(OH)(C_4H_7)_2$.

Although methyltrimethoxysilane is preferably employed as the silane cross-linker, other silane cross-linkers such as ethyltriethoxysilane, methyltripropoxysilane, and methyltriethoxysilane also can be used.

Disubstituted silyl ureas, such as the reaction product of substantially equal molar amounts of aminopropyltrimethoxysilane and isocyanatopropyltrimethoxysilane have been found to be effective in enhancing the self-bonding characteristics of the silicone elastomers resulting from the cure of the silicone caulking compositions of the present invention.

The bissilyl ureas are preferably compounds which are included within the formula,

where R, $R^1$, $R^2$ are as previously defined, $R^4$ and $R^5$ are the same or different $C_{(2-4)}$ divalent alkylene radicals, and x has a value of 0 to 2 inclusive, and preferably 1 or 2.

Additional ingredients which can be added to the caulking compositions of the present invention are antifoams to facilitate the mixing process, freeze-thaw stabilizers such as glycols to protect the compositions during storage, and pigments.

In order that those skilled in the art will be better able to practice the present invention, the following examples are given by way of illustration and not by way of limitation. All parts are by weight.

EXAMPLE

A base emulsion is prepared by passing through a Gaulin homogenizer, a mixture of about 5000 grams of a silanol-terminated polydimethylsiloxane, 5000 grams of water and about 100 grams of polyethylene glycol ether. The pH of the resulting mixture is adjusted by adding up to 200 grams of succinic acid. There is obtained a base formulation having about 60% solids and a pH of 4-6 of a silanol-terminated polydimethylsiloxane having an MW of about 10,000.

A mixture of 1500 g of the above base formulation is blended with 900 grams of ground calcium carbonate in a Ross double planetary mixer of 30-60 minutes, degassed, passed through a high shear Semco mixer for 15 minutes, and dispensed into anaerobic cartridges.

Disubstituted alkoxysilyl ureas were prepared by adding 1.61 grams of aminobutyldimethylmethoxysilane dropwise at 0° C. to 2.05 grams of isocyanatopropyltrimethoxysilane and 7 ml of hexane distilled from calcium hydride where the addition was made under a nitrogen atmosphere. The mixture was allowed to warm to room temperature and the solvent was removed in vacuo. Based on method of preparation and gas chromatographic analysis indicating complete consumption of the starting materials, there was obtained a quantitative yield of (N-dimethylmethoxysilylbutyl-N'-trimethoxysilylpropyl) urea (urea 2). Additional bissilyl urea compounds were prepared following the same procedure such as bis(N,N'trimethoxysilylpropyl) urea (urea 1), (trimethoxysilylpropyl-N'-propyl) urea (urea 3), and (N-trimethoxysilylpropyl-N'trimethylsilylpropyl) (urea 4).

Caulking compositions were prepared in accordance with the practice of the present invention, by injecting into the cartridges filled with the above-described base formulation, the catalyst mixture consisting of a stanoxane catalyst, methyltrimethoxysilane, toluene, and the bissilyl urea as previously described. The following shows the resulting caulking compositions in grams of injected material, per 100 grams of the base formulation:

TABLE I

|  | 1 | 2 | 3 | 4 |
|---|---|---|---|---|
| Clbu$_2$SnOSnbu$_2$OH(g) | 0.47 | 0.47 | 0.47 | 0.47 |
| MTMS | 0.5 | 0.5 | 0.5 | 0.5 |
| toluene | 1.0 | 1.0 | 1.0 | 1.0 |
| urea 1* | 0.2 |  |  |  |
| urea 2** |  | 0.3 |  |  |
| urea 3*** |  |  | 0.3 |  |
| urea 4**** |  |  |  | 0.3 |

*bis (N,N'trimethoxysilylpropyl) urea.
**(N dimethylmethoxysilylbutyl N'trimethoxysilylpropyl) urea.
***(N trimethoxysilylpropyl N'propyl) urea.
****(N trimethoxysilylpropyl N'trimethylsilylpropyl) urea.

After the above anaerobic cartridges were injected with the ingredients shown in Table I, the resulting caulking compositions were thoroughly mixed using a Semco mixer. The materials were then extruded onto steel and aluminum plates and cured for one week at 50% RH and one week at 50° C. prior to adhesion measurement. Tensile samples were also prepared initially and allowed to cure at 50% RH for one week prior to testing and also after one month aging in the tube. The following adhesion results were obtained where the numbers 1-4 correspond to the ureas used in the respective catalyzed caulking compositions shown in Table I:

TABLE II

| Adhesion (ppi) | 1 | 2 | 3 | 4 |
|---|---|---|---|---|
| Steel | 13.8 | 16.9 | 10.1 | 3.2 |
| Aluminum | 14.4 | 19.3 | 2.7 | 3.3 |

The above results show that the distributed ureas having two distinct alkoxysilyl groups provide superior adhesion, as compared to the compositions containing urea containing only one silylalkoxy group as illustrated in compositions 3 and 4.

The following physical properties were also obtained from the compositions which exhibited superior adhesion characteristics, where the numbers in () show the results obtained with silicone caulking materials aged in a tube for one month and then cured at 50% RH for one week.

The results shown in Table 3 show that the caulking compositions made in accordance with the practice of the present invention satisfy the physical property requirements for commercial application.

TABLE III

|  | 1 | 2 |
|---|---|---|
| Shore A | 17(20)* | 13 |
| Tensile Strength (psi) | 114(100) | 148 |
| Strain (%) | 608(651) | 802 |

*Results after aging in the tube for one month and then cured at 50% RH for one week.

Although the above example shows only a few of the very many variables which can be used in the practice of the present invention, it should be understood that the present invention is directed to a much broader variety of silicone caulking compositions containing various silanol-terminated polydiorganosiloxane, siliceous filler and cross-linking silane shown in the description preceding this example.

What is claimed and sought to be protected by Letters Patent of the United States is as follows:

1. Silicone caulking composition comprising (A) a base formulation having 40 to 60% solids comprising a silanol terminated polydimethylsiloxane having a molecular weight of about 5000 to 15,000 stabilized with nonionic surfactant and having a pH in the range of 4 to 6, (B) a calcium carbonate filler, (C) a trialkoxy silane, (D) a tin catalyst and (E) a bissilyl urea having the formula

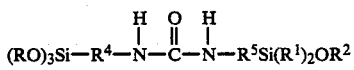

where the bissilyl urea is present in the silicone caulking composition at from 0.1 to 5 parts per 100 parts of the base formulation, R, $R^1$ and $R^2$ are selected from the same or different $C_{(1-8)}$ alkyl radicals, and $R^4$ and $R^5$ are selected from the same or different $C_{(2-4)}$ divalent alkylene radicals.

2. A silicone caulking composition in accordance with claim 1, where the bissilyl urea is the reaction product of substance under equal molar amounts of aminobutyldimethylmethoxy silane and isocyanatopropyltrimethoxysilane.

3. A silicone caulking composition in accordance with claim 1, where the tin catalyst is $Cl(C_4H_7)_2SnOSn(C_4H_7)_2OH$.

* * * * *